April 30, 1957 J. GORDON 2,790,843
SUSPENDED WIRE VIBRATION DAMPING MEANS
Filed May 27, 1952 3 Sheets-Sheet 2
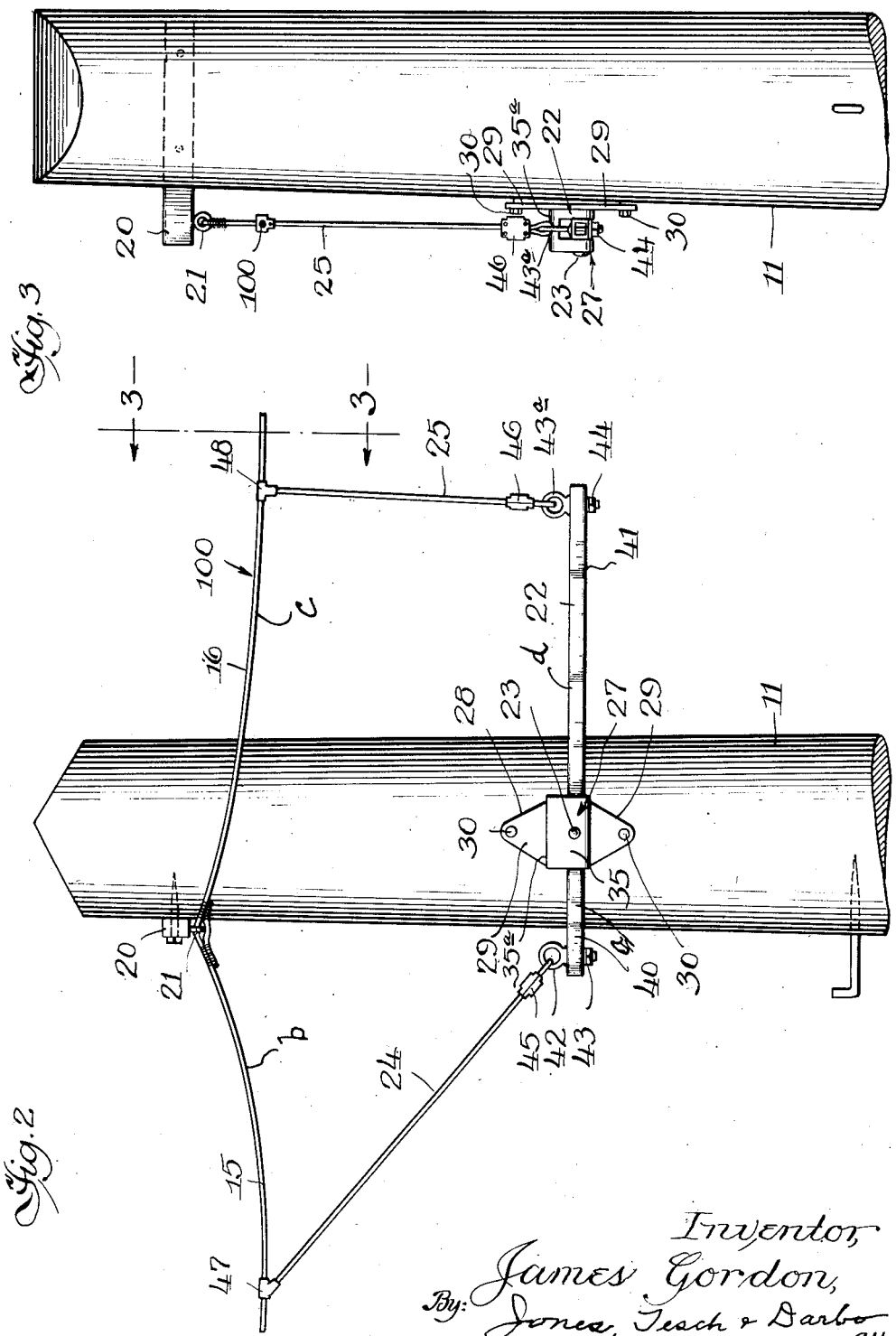
Inventor,
James Gordon,
By: Jones, Tesch & Darbo
Attys.

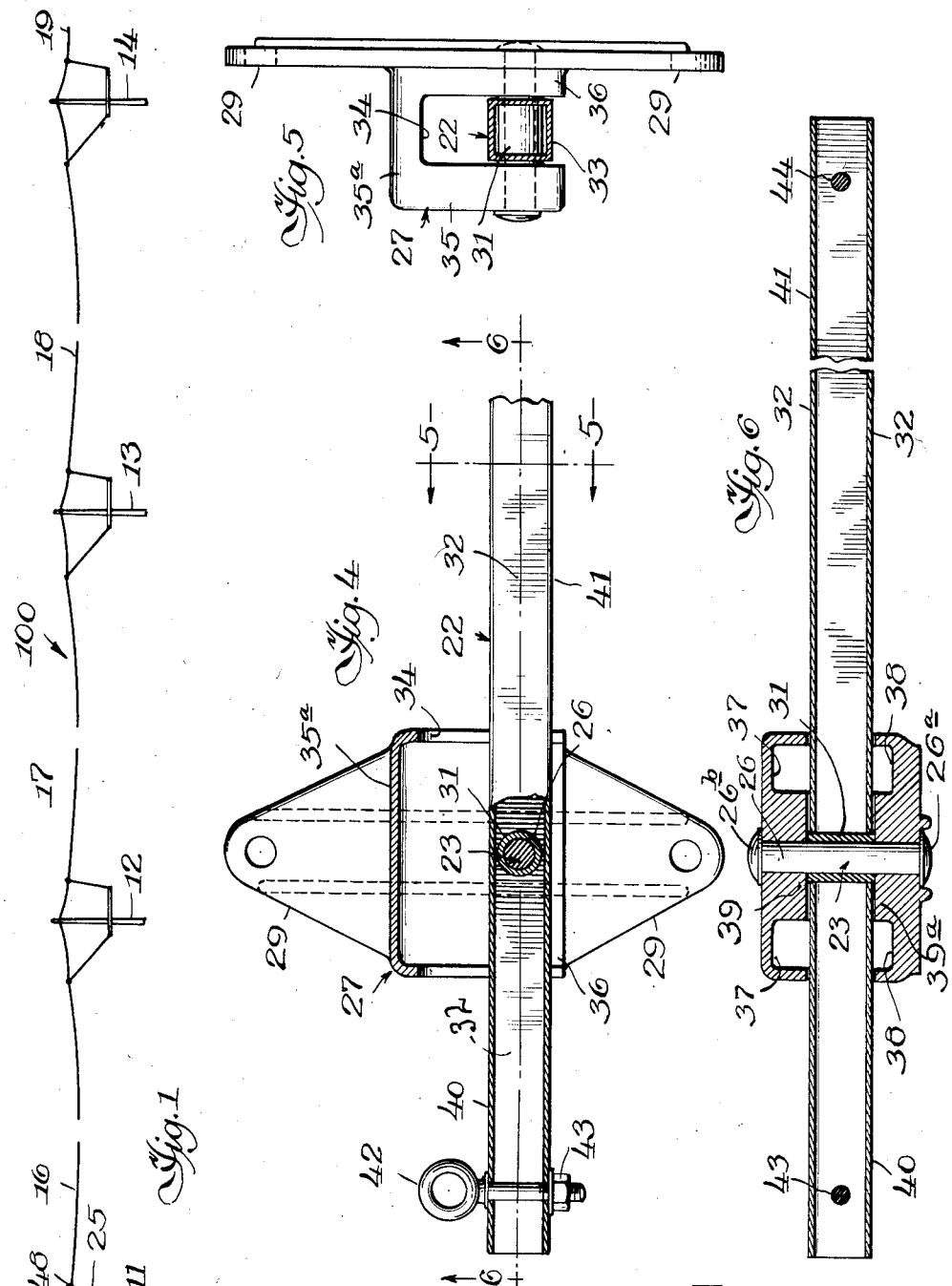

April 30, 1957 J. GORDON 2,790,843
SUSPENDED WIRE VIBRATION DAMPING MEANS
Filed May 27, 1952 3 Sheets-Sheet 3
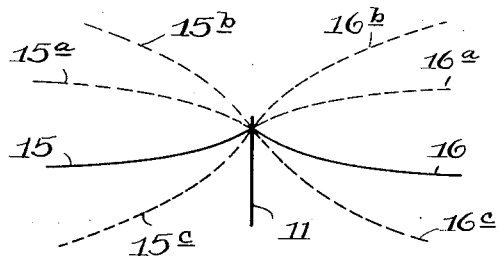
Fig. 7
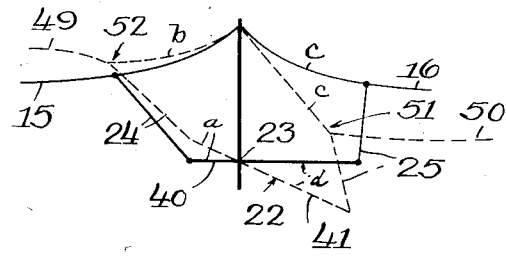
Fig. 8
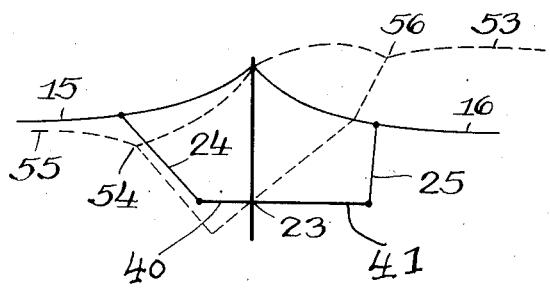
Fig. 9
Fig. 10
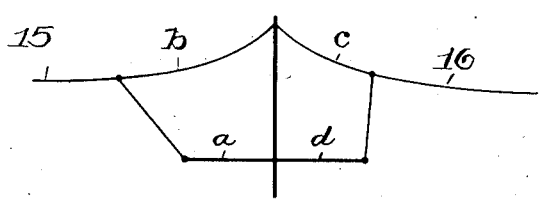
Inventor
James Gordon
By: Jones, Tiach & Darbo
Attys.

United States Patent Office 2,790,843
Patented Apr. 30, 1957

2,790,843
SUSPENDED WIRE VIBRATION DAMPING MEANS

James Gordon, Chicago, Ill.

Application May 27, 1952, Serial No. 290,365

2 Claims. (Cl. 174—42)

This invention relates to vibration damping means more particularly for damping the undesirable vibrations of telephone or other electric transmission wires or cables as they are strung from pole to pole in successive adjacent spans.

It is well known that in stormy weather a lateral wind, for reasons not necessary to be here gone into, will cause up and down movements of the wires with increasing amplitudes. This action is sometimes known as "galloping" and may and frequently does result in breakage of the wire or cable, causing great inconvenience to the public and a burdensome expense to the utility company. The condition is aggravated by accumulation of sleet on the wire, particularly in climates where the temperatures hover around 32° F. and when a rather strong transverse wind is blowing, the wind forces then causing self-excited vibrations, aggravated by aerodynamic formation of the sleet on the wires, that may build up to very large potentially destructive amplitudes.

In an important aspect, the present invention aims to provide novel and useful means for damping the "galloping" by modulating or modifying the amplitude of vibration of a span of the cable most affected by vibration exciting forces, by transmitting energy of vibration from such span to another span less subject to such forces, the latter in turn transmitting modifying forces back to the first span and thus causing one span to act as a brake on the more violently galloping adjacent span and dissipating energy of vibration of the latter over a larger extent of wire, thus employing what may be called a "feed back" principle. Since the present means may be associated with each of two adjoining spans successively over an indefinite extent of the transmission line, even though a number of adjoining spans are subjected to substantially equal vibration exciting forces, eventually a span or spans occurs in the line which is less so subjected and the braking effect is thus brought into play if it is not effective earlier.

In principle, as here illustrated, a new wave motion of different amplitude is superimposed on the original motion thus modifying the first wave motion, and deriving the energy for the new wave motion from the movement of the conductor or wire itself, thus preventing the amplitude from reaching a destructive stage.

In a preferred embodiment here illustrated, a device for this purpose is shown in the form of a lever bar pivotally mounted on the pole off-center so as to have a longer lever arm extending in the direction of one of the spans than in the direction of the other span, and connecting elements extending from each end of the lever bar to one of said spans at the same distances from the support point of each wire.

In another embodiment here illustrated, the lever bar may be centrally pivoted and the connecting elements connected to the wires respectively at different distances from their point of support.

The invention will be understood by reference to the following detailed description, taken together with the accompanying drawings, of the illustrative embodiments thereof.

In the drawings—

Figure 1 is a view, somewhat diagrammatic, of a number of wire-carrying poles each with an embodiment of the inveniton associated therewith;

Figure 2 is an enlarged view of one of the poles and an associated device of the present invention;

Figure 3 is an end view taken from the right-hand side of the structure of Fig. 2;

Figure 4 is an enlarged view, partially in section, of the lever bar and bracket therefor shown in Figs. 1 and 2, the bar being broken away at one end for purposes of saving space in the drawings;

Figure 5 is a side view of the structure of Fig. 4, and being a section taken on the line 5—5 of Fig. 4;

Figure 6 is a plan section taken on the line 6—6 of Fig. 4 looking upwardly thereat;

Figure 7 is a diagrammatic view of a pole and its wires extending in opposite directions therefrom without the present invention associated therewith and showing in dotted lines possible alternative positions of the wires;

Figure 8 is a similarly diagrammatic view showing a pole and two wires with a device of the present invention associated therewith, broken lines indicating alternative positions of the parts;

Figure 9 is a similarly diagrammatic view indicating other positions of the parts; and Figure 10 is a slightly modified construction following the invention.

Referring in detail to the illustrative construction shown in Figs. 1 to 9 inclusive of the drawings, the numerals 11, 12, 13 and 14 may indicate a series of wooden telephone poles, for example, or other wire or cable carrying poles, upon which may be supported one or more cables or wires, one such wire 100 being here shown, and including the spans thereof 15, 16, 17, 18 and 19. The wire may be supported on the poles as at a common point of support on each pole such as the cross-piece 20 (Figs. 2 and 3) to which the wire is attached by suitable secure fastening means 21. The wire 100 is thus strung along from pole to pole held away from the poles by the cross-pieces 20 which project laterally from each pole. Thus the pole 11 supports the spans 15 and 16, the pole 12 the spans 16 and 17, the pole 13 the spans 17 and 18, and the pole 14 the spans 18 and 19. Each pole supports the wire extending in two opposite directions from the pole, as the wire span 15 to the left of the pole 11 and the wire span 16 to the right of pole 11.

In accordance with the present invention, each pole or a plurality of the poles has associated therewith a rocking or lever bar 22 carried in a pivot 23 and having each of its ends connected as by flexible tie members 24 and 25 with the wire spans extending in opposite directions from the pole respectively and for a purpose presently more particularly described.

In this instance, the pivot or pivot means 23 is shown as a pivot bolt 26 carried by an enlarged central pivot box portion 27 of a pivot bracket 28 having upper and lower bracket flanges 29. By means of the latter and fasteners 30 passing therethrough and into the pole, as, for example, the pole 11, the pivot bolt 26 is securely attached to the pole. The pivot bolt may be headed or riveted at opposite ends as at 26a and 26b (Fig. 6).

The pivot bolt 26 has a bushing 31 rotatable on the pivot bolt and which in turn passes snugly through the side walls 32 of the lever bar 22, the latter being here shown of square cross-section as best seen at 33 (Fig. 5). The lever bar is thus pivotally mounted in the downwardly facing opening 34 in the pivot box 27 between the outer wall 35 of the pivot box and its inner wall 36 which latter is integral with the bracket flanges 29. The pivot box outer wall is mounted on and carried solely by the upper wall 35a making the pivot box of inverted U-shape. The lever bar 22 is thus mounted to be movable on the pivot 23 in a vertical plane generally parallel with the pole 11 and coincident with the wire 100. The front wall 35 of the pivot box may be relieved by pockets 37 formed during casting in the inner face of this wall, and, similarly, the rear wall 36 may be relieved by recesses 38 cast in the wall thereof, these recesses leaving internal box portions 39 for the wall 35 and 39a for the wall 36 which act as hubs to limit axial movement of the bushing 31 on the pivot bolt 26.

Further in accordance with the present invention, and as shown in Figs. 1 to 6 and 8 and 9 hereof, the lever bar 22 is mounted intermedially of the pivot 23 and with lever arms 40 and 41 extending therefrom of different and unequal lengths. The tie member 24 is flexibly secured to the lever arm 40 of the bar 22 as by an eye 42 bolted to the bar as at 43, and similarly the tie member 25 is flexibly secured to the lever arm 41 of the bar 22 by eye 43a secured as by bolt and nut 44. The tie members 24 and 25 may be wire ropes and 24 being clamped to eye 42 as by a closed loop 45, and 25 being similarly clamped to eye 43a by a closed loop 46.

Still following the present invention, the tie member 24 is fixedly secured to the wire 100, for example to span 15 thereof, as by the clamp 47, and similarly the tie member 25 is clamped to the wire 100 for example to the span 16 thereof by clamp 48.

For purposes of the present description and for defining a formula presently stated, the length of the lever arm 40, that is, from the pivot 23 to the eye 42 has been given the letter $a$ (Figs. 2 and 8); the length of the segment of the wire span 15 from the clamp 47 to the common support point 21 has been given the letter $b$; the length of the segment of the wire span 16 from the common support 21 to the clamp 48 has been given the letter $c$; and the length of the lever arm 41 from the pivot 23 to the eye 43a has been given the letter $d$.

Operation of the device is as follows:

Turning to Fig. 7 there is shown diagrammatically the pole 11, for example, and the wire spans 15 and 16 extending in opposite directions therefrom each in the usual catenary curve. Under the influence of wind forces, these spans may vibrate to alternative positions as indicated, for example, at 15a and 16a respectively. Under aggravated conditions, as, for example, by accumulations of sleet on the wires, and particularly if the sleet assumes an aerodynamic form, they may, unless damped, vibrate to an amplitude such as indicated at 15b at its upper node and 15c at its lower node for the span 15, and 16b for its upper node and 16c for its lower node for the span 16. The amplitudes 15b—15c and 16b—16c would be likely to be destructive of the wire and cause breakage of one or both spans thereof.

By means of the present invention, the vibrations are damped to prevent reaching the destructive amplitudes referred to and to limit the vibration to amplitudes approximately not greater than those indicated at 15—15a and 16—16a, this being accomplished, as here shown, by causing vibrational movements of one of the adjacent spans subject to the greater wind force to be transmitted to the other adjacent span subject to the lesser force and so as to tend to cause a greater movement of the last mentioned span, thereby absorbing and dissipating energy transmitted by the wind force to the first mentioned span.

To illustrate, as shown in Fig. 8, when the wind tends to vibrate the span 15 to say the position shown at 49, the lever arm 40 of the bar 22 is pulled upwardly by the tie member 24, the bar rotating on its pivot 23. This pivotal movement of the bar 22 causes a downward movement of the lever arm 41 or driven arm which in turn pulls downwardly on the wire span 16 through the intermediation of the tie member 25. Since the lever arm 41, or $d$, is longer than the lever arm 40, or $a$, the outer end of the arm 41, at the eye 43a, must travel through a larger arc than the outer end of the lever arm 40, represented by the eye 42, for a given distance of movement of the latter. Thus, since $b$ and $c$ are approximately equal, for the wind to move the span 15 to the position 49 it would have to move the span 16 to the position 50, a greater amplitude of movement. Consequently energy which would otherwise tend to cause vibration of the span 15 is transmitted from the span 15 to the span 16 thus absorbing and dissipating the force of the wind acting on span 15. Friction in the pivot means 23 may also absorb some of the energy.

It will be understood that as the wire 15 moves downward again in its vibration cycle the lever bar 22 is free to pivot in the opposite direction so that the lever arm 41 can move upwardly and permit the span 16 to move upwardly from the position 50 towards its original position, but each time span 15 is acted upon by a force tending to move it upwardly, the operation is repeated and a jerk is transmitted to the span 16 tending to pull the span 16 downwardly, and thus absorbing energy which would otherwise be effective in enlarging the amplitude of vibration of the span 15 to the destructive amplitude indicated at 15b—15c. The physical manifestation of this jerk on the span 16, which is believed to be beneficially effective in accomplishing the here desired result, is indicated by the somewhat angular formation of the wire 16 as at 51 at the point of connection thereto of the clamp 48 for the tie member 25, the other end of which is connected by the eye 43a with the long lever arm 41 of the bar 22. The effect of this jerk on the span 16 will in turn be transmitted back to the span 15 in a jerk which may be physically manifested somewhat by the angular formation of the span 15 in the position 49 as indicated at 52.

Conversely, as shown in Fig. 9, when the greater wind force is exerted on the span 16 tending to move the latter to the position 53, a jerk as at 54 is transmitted to the span 15 tending to move the latter to the position 55. This in turn transmits back a jerk to the span 16 if in the position 53 as indicated as at 56. In the case of Fig. 9, however, the damping action of the present device including the bar 22, on the span 16 (assuming that the latter rather than the span 15 is the one subjected to the greater wind force), may not be as great as the damping action of the device when as in Fig. 8 the span 15, for example, is subject to the greater wind force. This difference in result between Fig. 8 and Fig. 9 is due to the fact that in Fig. 9, the lever arm 40 (which is in Fig. 9 the driven arm) does not need to move through as great an arc as the lever arm 41 to accommodate a predetermined arcuate distance of movement of the latter under the influence of wind force on the span 16. Nevertheless, even in Fig. 9 some of the energy is transmitted tending to absorb and dissipate the wind forces otherwise exerted on span 16. Furthermore, the span 16 will be acted upon by the lever bar device on pole 12 and by the action of the latter device on span 17, and so on throughout the transmission line.

In the form shown in Figs. 1 to 6 inclusive and 8 and 9 the lever bar 22 is mounted off center so as to have one lever arm longer than the other. That is, $d$ is longer than $a$. In such case $b$ and $c$ are desirably of equal length or substantially so. A similar result may be accomplished by the modified form of the invention shown in Fig. 10 in which $a$ and $d$ are of equal length, that is the lever arm is centrally mounted, and $b$ and $c$ are of unequal length.

In either form, as at present advised, it is believed that the device is effective to accomplish the result described if the following formula be observed: that the ratio of $a$ to $b$ be substantially different from the ratio of $d$ to $c$. In other words, in Figs. 1 to 6 inclusive and 8 and 9, if $a$ be one foot and $b$ three feet, then the ratio of $d$ to $c$ should be other than one-third and may be for example, two feet for $d$ and three feet for $c$, or two-thirds. Or, $c$ and $d$ might be equal if $a$ and $b$ be unequal. Similarly, in Fig. 10, if $a$ and $d$ be equal or each two feet, then $b$ and $c$ should be unequal, or, say, three feet for $b$ and two feet or thereabouts for $c$ making the ratio $a$ to $b$ ⅔ and the ratio $d$ to $c$ 1. Here again the ratio $a/b$ and $d/c$ are unequal, rendering the device effective. It will be seen that this difference in ratio may be effective if any one of $a$, $b$, $c$ or $d$ be different from the other three in length.

As shown in the drawings, for example, the preferred proportion for best results is at present thought to be when $c$ equals (or approximately equals) $d$, and $b$ is twice or three times $a$, or of the order of these proportions. Generally, the greater the difference in the ratios $a:b$ and $d:c$, the more effective the device, at least within the limits of practicability, since the greater will then be the force transmitted from the first or driving span tending to cause a larger amplitude of vibration in the second or driven span.

As clearly shown in the drawings, the distance $b$ plus $c$ is desirably substantially greater than the distance $a$ plus $d$ and the distance from 21 to 23 is of the order of the distance $b$ or $c$ so that the lever pivot point 23 is a substantial distance below the attachment point 21.

As here disclosed, a damping mechanical advantage (by which is meant the modulating influence of the device on the span having the greater tendency to gallop) is obtained by reason of a difference in the angular movements of two adjoining wire spans under the influence of the modulating means actuated by wind forces tending to cause galloping, and this advantage is greater when the angular movement imposed is greater on the span subjected to the less wind force when the other span is given a certain angular movement by said force.

The invention is not intended to be limited to details of the expedients here illustrated, since the principle of the invention may be embodied in various forms and applications as may be here suggested to one apprised thereof by the present disclosure.

What is here claimed is:

1. In a device for damping the oscillation of an overhead electrical conductor wire having adjacent spans attached to a common support fixed with respect to the ground, a lever bar in the vertical plane of said wire intermediately pivoted on said support a substantial distance below said wire on a pivot point fixed with respect to the support, said bar having lever arms of substantially different lengths extending in opposite directions from the support, and flexible tie members connecting the free ends of the arms to the wire spans respectively at points spaced from said support and defining adjacent wire segments, the combined length of said segments being substantially greater than the length of said bar, the distance between the point of attachment of the wire to the support and the pivot point of the lever bar being of the order of the length of one of said segments and the ratio of the length of one lever arm to its adjacent wire segment being substantially different from the ratio of the length of the other lever arm to its adjacent wire segment whereby to effect an enhanced damping mechanical advantage and cause the oscillations arising in one span under the influence of wind forces to transmit to the other span an oscillation of a substantially different amplitude to damp the oscillations in said one span.

2. In a device for damping the oscillations of an overhead eletcrical conductor wire having adjacent spans attached to a common support fixed with respect to the ground, a lever bar in the vertical plane of said wire intermediately pivoted on said support a substantial distance below said wire on a pivot point fixed with respect to the support, and flexible tie members connecting the free ends of the bar to the wire spans respectively at points spaced from said support and defining adjacent wire segments, the combined length of said segments being substantially greater than the length of said bar, the distance between the point of attachment of the wire to the support and the pivot point of the lever bar being of the order of the length of said segments respectively and the ratio of the length of one end of the lever bar to its adjacent wire segment being substantially different from the ratio of the length of the other end of the lever bar to its adjacent wire segment whereby to effect an enhanced damping mechanical advantage under the influence of wind forces and cause the oscillations arising in one span under the influence of wind forces to transmit to the other span an oscillation of a substantially different amplitude to damp the oscillations in said one span.

References Cited in the file of this patent

UNITED STATES PATENTS

| 1,965,494 | Goodrich | July 3, 1934 |
| 2,043,717 | Stickley | June 9, 1936 |
| 2,058,174 | Monroe | Oct. 20, 1936 |
| 2,065,336 | Langton | Dec. 22, 1936 |

FOREIGN PATENTS

| 356,967 | Great Britain | Sept. 17, 1931 |
| 357,877 | Great Britain | Oct. 1, 1931 |
| 357,878 | Great Britain | Oct. 1, 1931 |